(12) United States Patent
Sudani et al.

(10) Patent No.: US 6,619,616 B1
(45) Date of Patent: Sep. 16, 2003

(54) SOLENOID VALVE DEVICE

(75) Inventors: Yuzuru Sudani, Hekinan (JP); Taku Itoh, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/385,466

(22) Filed: Mar. 12, 2003

(30) Foreign Application Priority Data

Mar. 15, 2002 (JP) ........................................ 2002-072439

(51) Int. Cl.[7] ............................................ F15B 13/044
(52) U.S. Cl. ............................ 251/129.14; 137/596.17; 335/255
(58) Field of Search ................... 335/255; 137/596.17; 251/129.01, 129.02, 129.14, 129.15

(56) References Cited

U.S. PATENT DOCUMENTS 5,915,416 A * 6/1999 Okazaki et al. ........ 137/596.17
6,163,239 A   12/2000 Ozawa et al. ............... 335/256

* cited by examiner

Primary Examiner—Ramon M. Barrera
(74) Attorney, Agent, or Firm—Nixon & Vanderhye P.C.

(57) ABSTRACT

In a solenoid valve device, a housing has a stopper formed on an inner wall of a fluid passage around an axial end of an accommodation bore. A valve seat member fixed to an inner circumferential wall of the fluid passage has a through-hole causing an input port to communicate with a drain port, a communication bore causing the through-hole to communicate with an output port and first and second valve seats formed around both ends of the through-hole, respectively. A movable member has a contact portion accommodated in the fluid passage between the stopper and the second valve seat. A ball is arranged on an opposite side to the contact portion with respect to the valve seat member. When the movable member moves with a movable core, the contact portion resting at the stopper or the second valve seat defines reciprocating moving stroke of the movable member.

6 Claims, 4 Drawing Sheets

SOLENOID VALVE DEVICE

CROSS REFERENCE TO RELATED APPLICATIONS

This application is based upon and claims the benefit of priority of Japanese Patent Application No. 2002-72439 filed on Mar. 15, 2002, the content of which is incorporated herein by reference.

BACKGROUND OF THE INVENTION

1. Field of the Invention

The present invention relates to a solenoid valve device having three fluid ports in which fluid communication among the three fluid ports is switched over.

2. Description of Related Art

In a conventional solenoid valve device, a fluid passage and three fluid ports communicating with the fluid passage are formed in a housing. Fluid communication among the three fluid ports is switched over by reciprocating movement of a valve member accommodated in the fluid passage. The conventional solenoid valve device, in which a stopper portion coming in contact with the valve member and defining a stroke of the valve member reciprocatingly movable is positioned outside the housing, has a drawback in that sounds or noises generated by the valve member hitting on the stopper portion are likely heard outside the solenoid valve device.

U.S. Pat. No. 6,163,239 discloses a solenoid valve device that is duty controlled for switching over the communication among the three fluid ports. In the solenoid valve device disclosed in U.S. Pat. No. 6,163,239, when a plunger is attracted toward a guide upon energizing a coil, the plunger rests at a position away by a certain gap from the guide so that the plunger never hits the guide. When the plunger moves in a direction of leaving the guide upon de-energizing the coil, position of the plunger away from the guide is governed by a biasing force of a spring that urges the plunger toward the guide.

When the spring defines the position of the plunger away from the guide, the position of the plunger is likely to vary for a while just after the coil is de-energized. In case of the duty controlled solenoid valve device, in particular, when a very high duty ratio becomes necessary and the coil is energized in a very short time after the coil is de-energized, the position of the plunger on energizing the coil tends to be fluctuated. This causes a drawback in that correlation between the duty ratio and output pressure does not show a linear line and is unstable, as shown in FIG. 3B.

SUMMARY OF THE INVENTION

An object of the present invention is to provide a solenoid valve device in which hitting noises are hardly heard outside.

Another object of the present invention is to provide a solenoid valve in which correlation between the duty ratio and the output pressure is stable.

To achieve the above object, a solenoid valve device for switching over communication among first, second and third fluid circuits is composed of a stator including a coil, a housing made of magnetic material and connected with the stator, a movable core, a valve seat member fixed to an inside of the housing, a movable member fixed to and movable together with the movable core, and a ball. The housing has a fluid passage formed inside, an accommodation bore whose axial end communicates with the fluid passage and whose another axial end is opened to an outer wall of the housing on a side of the stator, and first, second and third fluid ports through which the first, second and third fluid circuits communicate with the fluid passage, respectively. The housing is further provided on an inner wall of the housing forming the fluid passage around the axial end of the accommodation bore with a stopper portion. The movable core is axially opposed to and spaced from the outer wall of the housing to which the accommodation bore is opened and axially movable reciprocatingly upon energizing and de-energizing the coil. The valve seat member is fixed to an inner circumferential wall of the housing forming the fluid passage and has a through-hole through which the first fluid port is capable to communicate with the third fluid port, a communication bore through which the through-hole communicates with the second fluid port, a first valve seat formed around an axial end of the through-hole on a side of the first fluid port and a second valve seat formed around another axial end of the through-hole on a side of the third fluid port. The movable member extends axially through the accommodation bore and has a contact portion accommodated in the fluid passage between the stopper portion and the second valve seat and a rod inserted into the through-hole from a side of the contact portion with a gap between an outer circumference of the rod and an inner circumference of the through-hole. The ball is arranged on an opposite side to the contact portion with respect to the valve seat member and axially urged toward the first valve seat.

With the solenoid valve mentioned above, when the movable member moves with the movable core toward the stator, the contact portion comes in contact with and rests at the stopper portion so that the ball comes in contact with the first valve seat, which results in achieving communication between the second and third fluid ports through the through-hole and the communication bore and shutting off communication between the first and second fluid ports and communication between the first and third fluid ports. On the other hand, when the movable member moves with the movable core in a direction opposite to the stator, the contact portion comes in contact with and rests at the second valve seat so that the ball is pushed by the rod and leaves the first contact portion, which results in achieving communication between the first and second fluid ports through the through-hole and the communication bore and shutting off communication between the third and first fluid ports and communication between the third and second fluid ports.

It is preferable that the first fluid port is a fluid input port, the second fluid port is a fluid output port and the third fluid port is a fluid drain port.

Though hitting noises occur when the contact portion hits on and rests at the stopper portion or the second valve seat, the hitting noises are hardly heard outside the solenoid valve device, since stiffness of the housing is high and sounds generated in the housing are hardly heard outside the housing. Further, if a substantial part of the housing including first, second and third fluid ports is inserted into a valve body in which the first, second and third fluid circuits are formed, the hitting noises do not leak outside the solenoid valve device.

Further, when the solenoid valve device is duty controlled for switching over the communication among the first, second and third fluid ports, the contact portion of the movable member hits on and rests at the stopper portion or the second valve seat upon de-energizing the coil so that the rest position of the movable member is not fluctuated. Accordingly, the relationship between duty ratio and output pressure of the output is linear and stable.

Moreover, it is preferable that each area of the contact portion and the second valve seat in contact with the contact portion is extremely small to an extent of eliminating a substantial influence of adhesive force due to fluid viscosity between mutual contact surfaces but sufficiently large to an extent of securing allowable limited wear of the mutual contact surfaces.

In case of using the fluid whose viscosity increases with decrease of temperature, adhesive force due to fluid viscosity tends to alter a timing when the contact portion leaves the stopper portion or the second seat valve according to change of the temperature. However, since the area of the contact portion and the second valve seat in contact with the contact portion is extremely small, the timing when the contact portion leaves the stopper portion or the second seat valve is hardly influenced by change of the fluid viscosity so that the relationship between the duty ratio and the output pressure is not variable.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

First Embodiment

Figure 1:
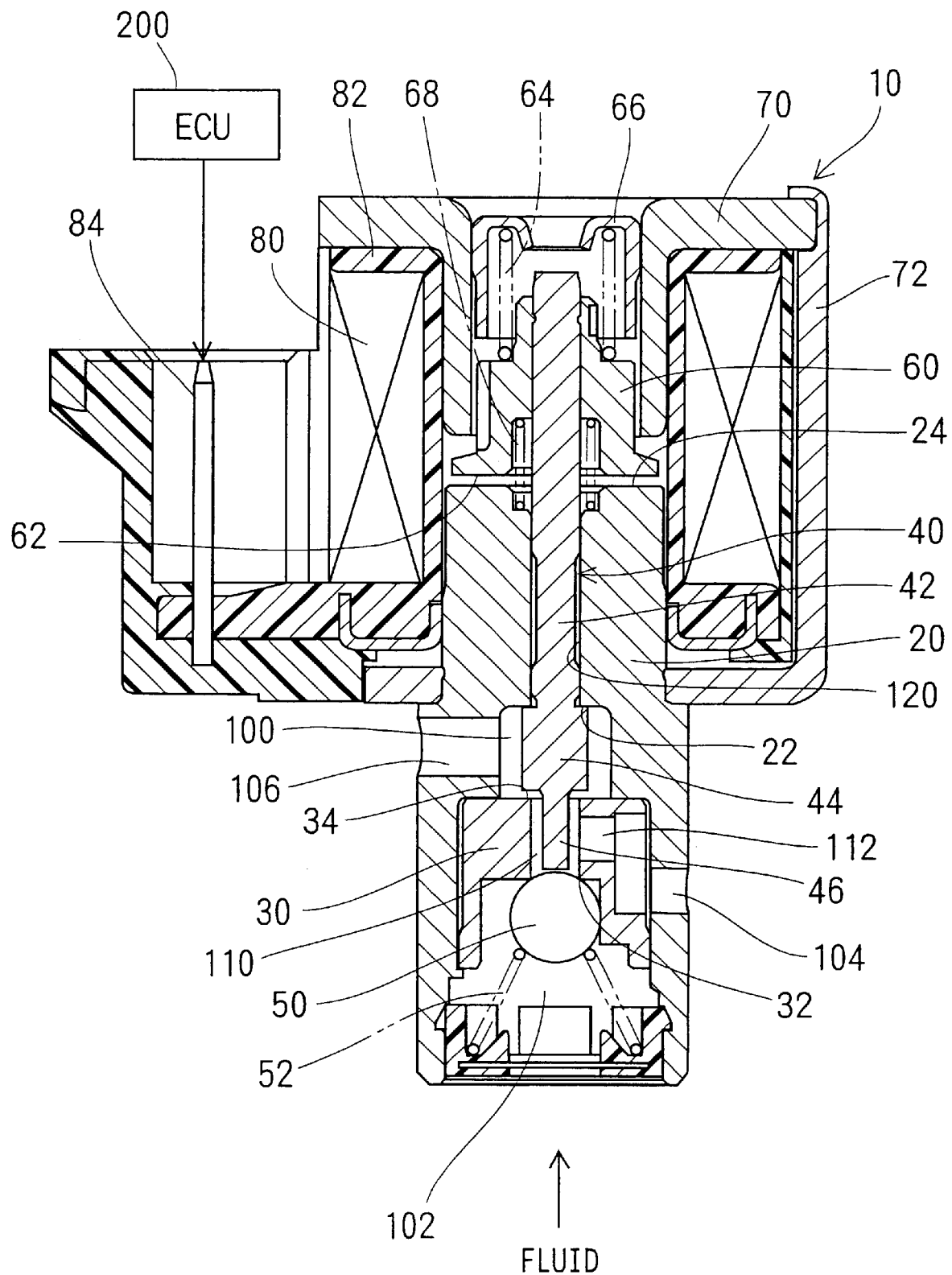
FIG. 1 is a cross sectional view of a solenoid valve device according to a first embodiment of the present invention.

A solenoid valve device according to a first embodiment, which is a hydraulic control valve applied to an automatic transmission, is described with reference to FIGS. 1 and 2.

A solenoid valve device 10, which is a three-way electromagnetic valve for controlling hydraulic pressure of oil to be supplied to a clutch or a brake acting as an engagement device of the automatic transmission, is mounted on a valve body in which hydraulic circuits are formed.

A housing 20, a movable core 60, a fixed core 70 and a yoke 72, which are made of magnetic material such as iron, constitute a magnetic path of the solenoid valve device 10. The fixed core 70 is fixed to the yoke 72 by staking or crimping. The housing 20 is fixed to the yoke 72 by press fitting or staking. A fluid passage 100 and an accommodation bore 120 constitute a through-hole of the housing 20 extending from an input port 102 in a direction in which a movable member 40 reciprocatingly moves. A stopper portion 22 is formed on an inner wall of the housing 20 forming the fluid passage 100 around an axial end of the accommodation bore 120. Each of the input port 102 as a first fluid port, an output port 104 as a second fluid port and a drain port 106 as a third fluid port communicates with the fluid passage 100. A part of the housing 20 covering from an axial lower end thereof up to a portion below the drain port 106 in FIG. 1 is inserted into the valve body. The input port 102 communicates with a high pressure fluid source. The output port 104 communicates via a fluid path (not shown) with the clutch or the brake of the automatic transmission. The drain port 106 communicates with a low pressure drain.

Fluid flows in from the input port 102 according to the reciprocating movement of the moving member 40. Respective flow directions of the fluid through the output port 104 and the drain port 106 are perpendicular to the flow direction of the fluid through the input port 102.

A valve seat member 30 is fitted to an inner circumferential wall of the housing 20 forming the input port 102. The valve seat member 30 is provided with a through-hole 110 through which the input port 102 is capable to communicate with the drain port 106. A communication bore 112 causes the output port 104 to communicate with the through-hole 110. The valve seat member 30 is provided around an axial end of the through-hole 110 on a side of the input port 102 with a first valve seat 32 and around the other axial end of the through-hole 110 on a side of the drain port 106 with a second valve seat 34.

The movable member 40 is composed of a shaft 42, a contact portion 44 and a rod 46, which are arranged in series from a side of the movable core 60 and integrally formed in a single piece. The shaft 42 is accommodated in the accommodation bore 120. Diameter of the contact portion 44 is larger than that of the shaft 42 or the rod 46. When the movable member 40 reciprocatingly moves together with the movable core 60, the contact portion 44 comes in contact with and is stopped by the stopper portion 22 or the second valve seat 34. An area of the stopper portion 22 or the second valve seat 34 with which the contact portion 44 comes in contact is very small as far as wear of the mutual contact surfaces is limited. Reciprocating moving stroke of the movable member 40 is defined in such a manner that the contact portion 44 comes in contact with the stopper portion 22 or the second valve seat 34. The rod 46 is inserted into the through-hole 110 from a side of the contact portion 44. A fluid path is formed around the rod 46.

A ball 50 is positioned on an opposite side to the contact portion 44 with respect to the valve seat member 30. The ball 50 is capable to come in contact with the rod 46. A spring 52 urges the ball 50 toward the first valve seat 32.

The movable core 60 is fixed to the shaft 42 and moves reciprocatingly together with the movable member 40. A magnetic attracting surface 62 of the movable core 60 is opposed to a magnetic attracting surface 24 of the housing 20. A spring 64 urges the movable core 60 toward the magnetic attracting surface 24. An adjuster 66 is press fitted to the fixed core 70. Biasing force of the spring 64 can be adjusted by controlling a press fitting amount of the adjuster 66 to the fixed core 70. A spring 68 urges the movable core 60 in a direction away from the magnetic attracting surface 24. The biasing force of the spring 68 is larger than that of the spring 64.

A coil 80 is wound on a bobbin 82 and positioned around the housing 20 and the fixed core 70. Current is supplied through a terminal 84 to the coil 80. An engine control unit (ECU) 200 duty controls the current to be supplied to the coil 80.

Figure 2:
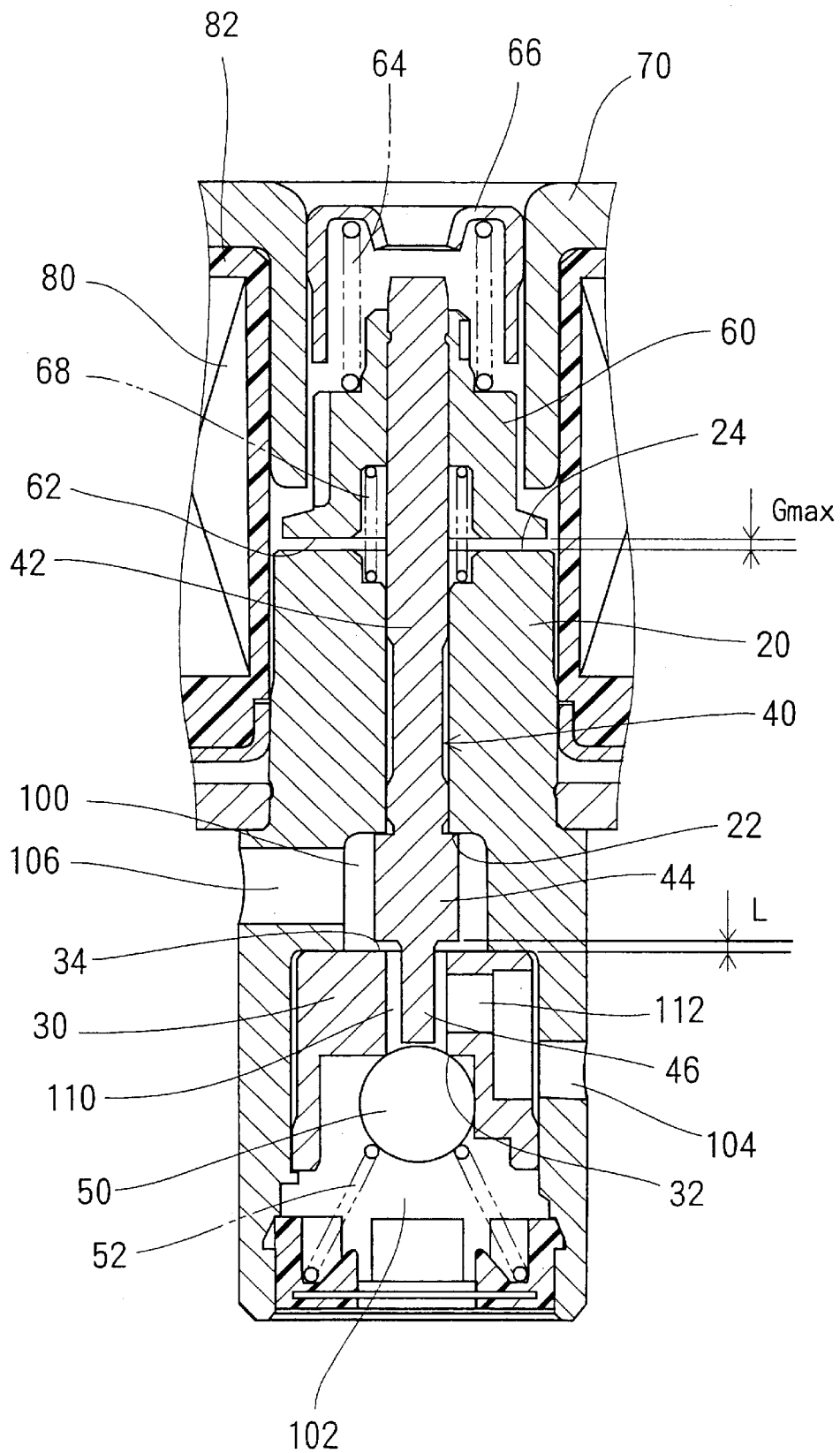
FIG. 2 is a partly enlarge view of the solenoid valve device of FIG. 1.

When the current is not supplied to the coil 80, the movable core 60 is at a position away from the housing 20 as shown in FIG. 1, since the biasing force of the spring 68 is larger than that of the spring 64. The contact portion 44 of the movable member 40 leaves the second valve seat 34 and is in contact with the stopper portion 22. The ball 50 is in contact with the first valve seat 32 due to the biasing force of the spring 52. At this time, the ball 50 is not in contact with the rod 46. A gap between the magnetic attracting surface 62 of the movable core 60 and the magnetic attracting surface 24 of the housing shows a maximum air gap Gmax (refer to FIG. 2). The output port 104 communicates via the communication bore 112 and the through-hole 100 with the drain port 106. As the fluid flows out from the output port 104 to the drain port 106, output pressure of the output port 104 decreases.

When the current is supplied to the coil 80, a magnetic attracting force occurs between the housing 20 and the movable core 60. The movable core 60 moves against the biasing force of the spring 68 toward the housing 20 until the contact portion 44 of the movable member 40 comes in contact with the second valve seat 34. When the contact portion 44 comes in contact with the second valve seat 34, the ball 50, which is pushed by the rod 46, leaves the first valve seat 32. As the input port 102 communicates via the through-hole 110 and the communication bore 112 with the output port 104, the fluid is supplied from the input port 102 to the output port 104 so that output pressure of the output port 104 increases. The communication between the drain port 106 and the input port 102 or the output port 104 is shut off. At this time, the gap between the magnetic attracting surface 62 of the movable core 60 and the magnetic attracting surface 24 of the housing 20 shows a value (Gmax−L) obtained by subtracting a stroke L of the movable member 40 from the maximum air gap Gmax (refer to FIG. 2) so that the magnetic attracting surface 62 of the movable core 60 does not come in contact with the magnetic attracting surface 24 of the housing 20.

According to the first embodiment mentioned above, when the movable member 40 reciprocatingly moves together with the movable core 60, the reciprocating moving stroke of the movable member 40 is defined in such a manner that the contact portion 44 hits on and rests at the stopper portion 22 formed in the inner circumferential wall of the housing 20 or the second valve seat 34 of the valve seat member 30 fixed to the inner circumferential wall of the housing 20. Stiffness of the housing 20 is high, since the housing accommodates the valve seat member 30 and holds the movable member 40 reciprocatingly movable therein. Further, the part of the housing 20 covering from the axial lower end thereof up to a portion below the drain port 106 in FIG. 1 is accommodated in the valve body. Accordingly, even if the contact portion 44 hits on the stopper portion 22 or the second valve seat 34, hitting noises are hardly heard outside the housing 20, that is, outside the solenoid valve device 10.

Figure 3A:
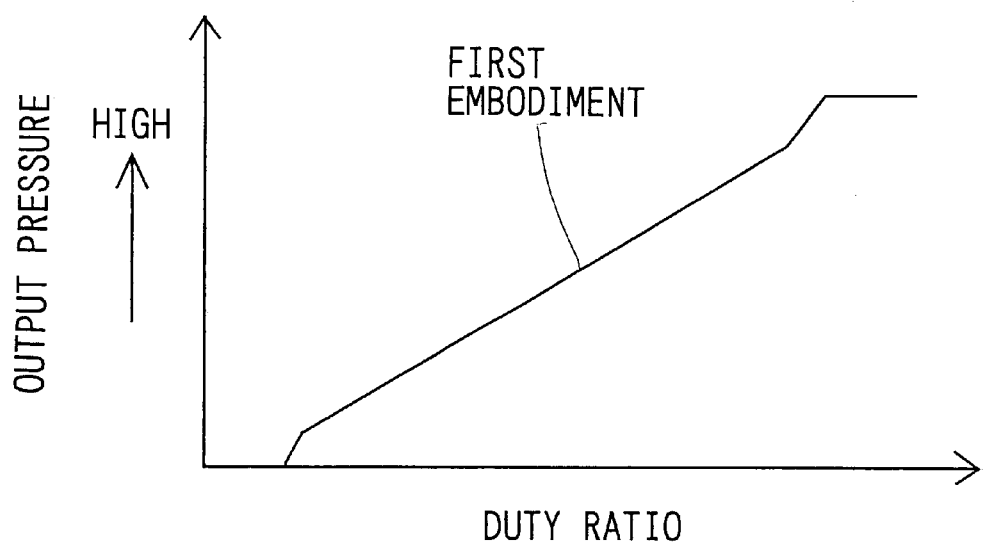
FIG. 3A is a graph showing relationship between duty ratio and output pressure according to the first embodiment.
Figure 3B:
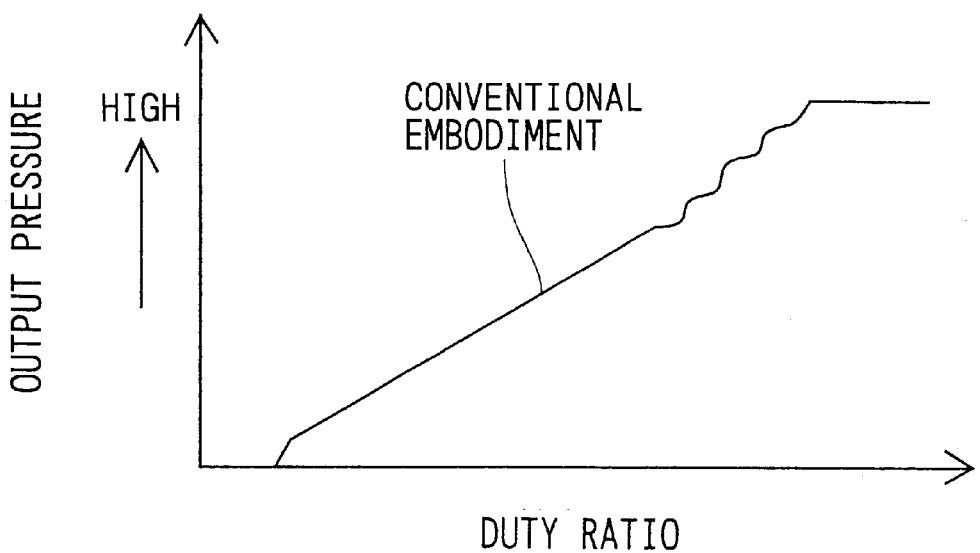
FIG. 3B is a graph showing relationship between duty ratio and output pressure according to a conventional embodiment.

Further, according to the first embodiment, when the movable member 40 reciprocatingly moves upon energizing or de-energizing the coil 80, the contact portion 44 is stopped by the stopper portion 22 or the second valve seat 34 so that the rest position of the movable member 40 is stable and not fluctuated. As a result, on duty controlling the current to be supplied to the coil 80, relationship between a duty ratio of current and the output pressure of the output port 104 can be shown as a substantially linear line, as illustrated in FIG. 3A. In the solenoid valve 10 of the first embodiment, the output pressure of the output port 104 increases with increase of the duty ratio.

Second Embodiment

Figure 4:
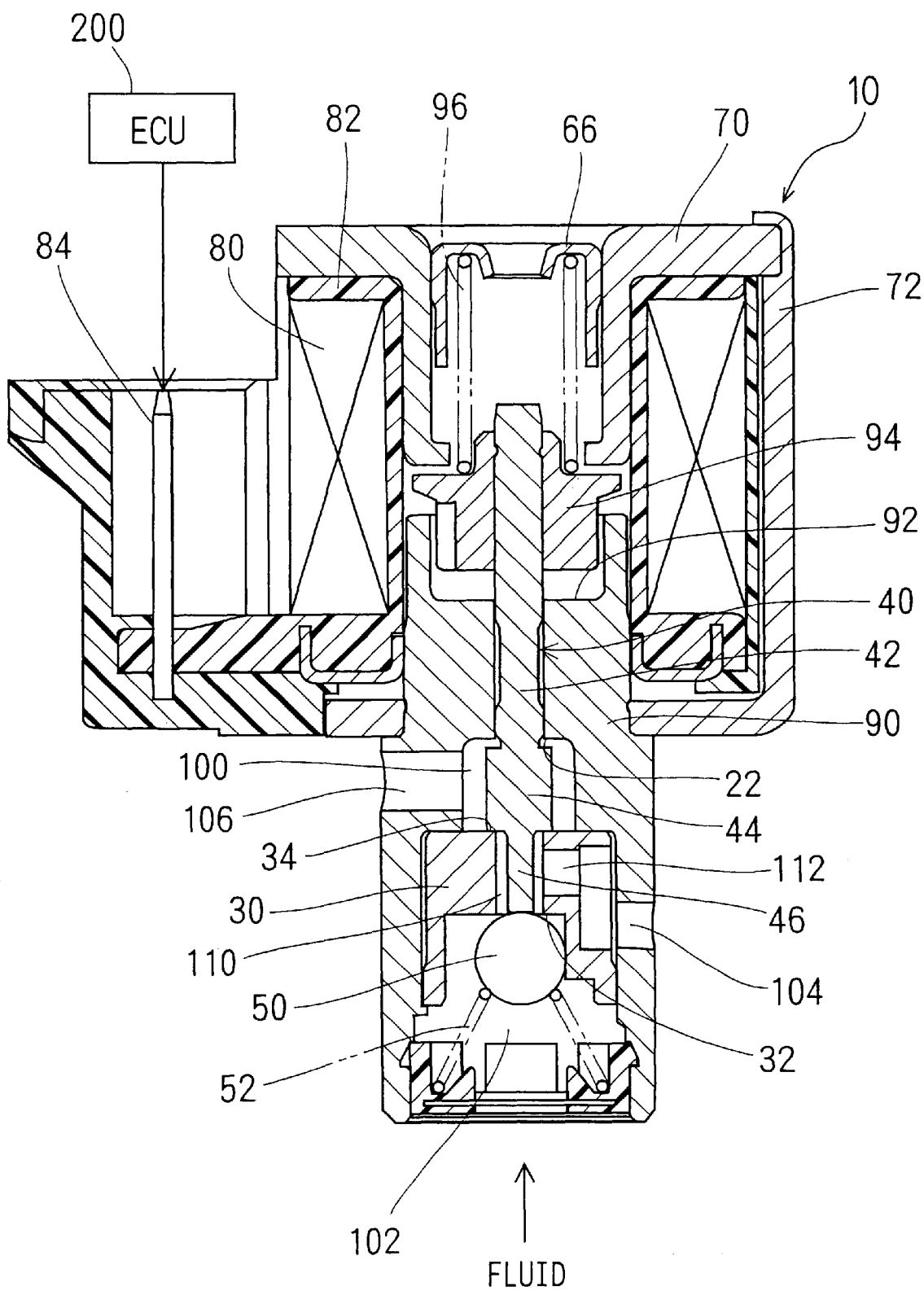
FIG. 4 is across sectional view of a solenoid valve device according to a second embodiment of the present invention.

A solenoid valve device 10 according to a second embodiment is described with reference to FIG. 4.

A housing 90 is provided at an outer wall facing a movable core 92 with a recess 92. A spring 96 as a biasing member urges the movable core 92 toward the recess 92. When the movable member 40 reciprocatingly moves together with the movable core 94, the reciprocating moving stroke of the movable member 40 is defined in such a manner that the contact portion 44 hits on and rests at the stopper portion 22 formed in the inner circumferential wall of the housing 20 or the second valve seat 34 of the valve seat member 30 fixed to the inner circumferential wall of the housing 20.

When the current is not supplied to the coil 80, the contact portion 44 of the movable member 40 is in contact with the second valve seat 34 due to the biasing force of the spring 96. The ball 50, which is pushed by the rod 46, leaves the first valve seat 32. As the input port 102 communicates via the through-hole 110 and the communication bore 112 with the output port 104, the fluid is supplied from the input port 102 to the output port 104 so that output pressure of the output port 104 increases. The communication between the drain port 106 and the input port 102 or the output port 104 is shut off.

When the current is supplied to the coil 80, the contact portion 44 moves against the biasing force of the spring 96 to leave the second valve seat 34 and to rest at the stopper portion 22. The ball 50 is in contact with the first valve seat 32 due to the biasing force of the spring 52. At this time, the ball 50 is not in contact with the rod 46. The output port 104 communicates via the communication bore 112 and the through-hole 110 with the drain port 106. As the fluid flows out from the output port 104 to the drain port 106, output pressure of the output port 104 decreases.

On duty controlling the current to be supplied to the coil 80, relationship between a duty ratio of current and the output pressure of the output port 104 can be shown as a linear line having a gradient opposite to that of the line illustrated in FIG. 3A. In the solenoid valve 10 according to the second embodiment, the output pressure of the output port 104 decreases with increase of the duty ratio. An area of the stopper portion 22 or the second valve seat 34 with which the contact portion 44 comes in contact is very small as far as limited wear of the mutual contact surfaces is ensured. Accordingly, when the contact portion 44 in contact with the stopper portion 22 or the second valve seat 34 leaves the stopper portion 22 or the second valve seat 34, an adhesive force acting on the contact portion 44 to the stopper portion 22 or the second valve seat 34 is small, even if temperature of the fluid is low and viscosity of the fluid is high. As a result, on duty controlling the current to be applied to the coil 80, timing when the movable member 40 leaves the stopper portion 22 or the second valve seat 34 for the reciprocating movement is not influenced by the viscosity of the fluid so that the relationship between the duty ratio and the output pressure is always constant irrelevant to change of temperature.

In the embodiments mentioned above, application of the present invention is not limited to the solenoid valve device that is duty controlled. The present invention is also applicable to a solenoid valve device to be used as a switching valve in which communication among three fluid ports is switched over and current to be supplied to a coil is not duty controlled. In this case, hitting noises of a reciprocatingly movable member are hardly heard outside the solenoid valve.

What is claimed is:

1. A solenoid valve device for switching over communication among first, second and third fluid circuits, comprising:

a stator including a coil;

a housing, made of magnetic material and connected with the stator, having a fluid passage formed inside, an accommodation bore whose axial end communicates with the fluid passage and whose another axial end is opened to an outer wall of the housing on a side of the stator, and first, second and third fluid ports through which the first, second and third fluid circuits communicate with the fluid passage, respectively, the housing being provided on an inner wall of the housing forming the fluid passage around the axial end of the accommodation bore with a stopper portion;

a movable core axially opposed to and spaced from the outer wall of the housing to which the accommodation bore is opened and axially movable reciprocatingly upon energizing and de-energizing the coil;

a valve seat member, fixed to an inner circumferential wall of the housing forming the fluid passage, having a through-hole through which the first fluid port is capable to communicate with the third fluid port, a communication bore through which the through-hole communicates with the second fluid port, a first valve seat formed around an axial end of the through-hole on a side of the first fluid port and a second valve seat formed around another axial end of the through-hole on a side of the third fluid port;

a movable member fixed to and movable together with the movable core, the movable member extending axially through the accommodation bore and having a contact portion accommodated in the fluid passage between the stopper portion and the second valve seat and a rod inserted into the through-hole from a side of the contact portion with a gap between an outer circumference of the rod and an inner circumference of the through-hole;

a ball arranged on an opposite side to the contact portion with respect to the valve seat member and axially urged toward the first valve seat, wherein, when the movable member moves with the movable core toward the stator, the contact portion comes in contact with and rests at the stopper portion so that the ball comes in contact with the first valve seat, which results in achieving communication between the second and third fluid ports through the through-hole and the communication bore and shutting off communication between the first and second fluid ports and communication between the first and third fluid ports and, when the movable member moves with the movable core in a direction opposite to the stator, the contact portion comes in contact with and rest at the second valve seat so that the ball is pushed by the rod and leaves the first valve seat, which results in achieving communication between the first and second fluid ports through the through-hole and the communication bore and shutting off communication between the third and first fluid ports and communication between the third and second fluid ports.

2. A solenoid valve device according to claim 1, wherein, when the coil is de-energized, the movable core is urged in a direction of leaving the housing so that the contact portion is in contact with the stopper portion and the ball is in contact with the first valve seat and, when the coil is energized, the movable core is attracted toward the housing so that the contact portion comes in contact with the second valve seat and the ball leaves the first valve seat.

3. A solenoid valve device according to claim 1, wherein, when the coil is de-energized, the movable core is urged toward the housing so that the contact portion is in contact with the second valve seat and the ball leaves the first valve seat and, when the coil is energized, the movable core is attracted in a direction of leaving the housing so that the contact portion comes in contact with the stopper portion and the ball comes in contact with the first valve seat.

4. A solenoid valve device according to claim 1, wherein the first fluid port is a fluid input port, the second fluid port is a fluid output port and the third fluid port is a fluid drain port.

5. A solenoid valve device according to claim 1, further comprising:

An electrical control unit for duty controlling current to be supplied to the coil.

6. A solenoid valve device according to claim 1, wherein each area of the contact portion and the second valve seat in contact with the contact portion is extremely small to an extent of eliminating a substantial influence of adhesive force due to fluid viscosity between mutual contact surfaces but sufficiently large to an extent of securing allowable limited wear of the mutual contact surfaces.

* * * * *